Figure 1:
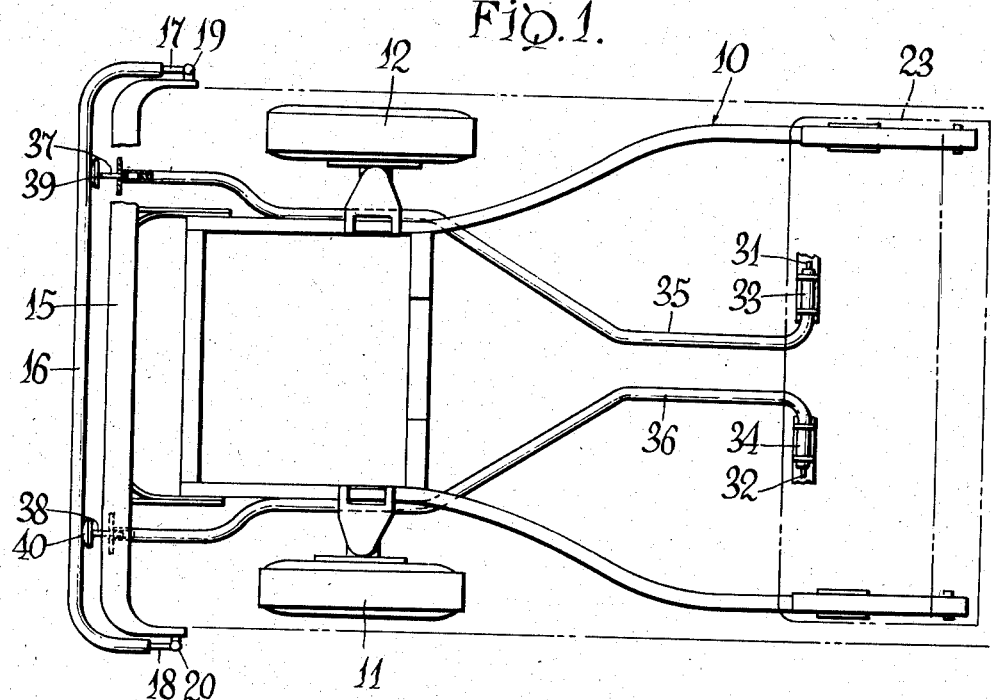

April 21, 1959

R. R. RACINE 2,883,206

SAFETY VEHICLE SEAT

Filed Aug. 13, 1957

INVENTOR.
Roger R. Racine,
BY
Bean, Brooks, Buckley & Bean.
ATTORNEYS.

United States Patent Office 2,883,206
Patented Apr. 21, 1959

2,883,206
SAFETY VEHICLE SEAT

Roger R. Racine, Tonawanda, N.Y., assignor to Protect-O-Matic Corporation, Kenmore, N.Y.

Application August 13, 1957, Serial No. 677,855

10 Claims. (Cl. 280—29)

This invention relates to automotive vehicles and particularly to automotive seating apparatus and associated mechanism which operates to protect the operator and passengers against injury due to collision or impact of the vehicle against another vehicle or a stationary object. It is well known that personal injuries in the case of front end collision of automotive vehicles are caused mainly by the occupants being thrown forwardly against the windshield or portions of the vehicle lying forwardly of the occupants.

In recent years rising accident rates have given rise to strong consciousness of the inadequacy of existing automotive vehicles from the standpoint of passenger safety. More recently seat belts for passengers have been made available on a wide scale but it is recognized by safety experts that seat belts are effective only in certain types of accidents and are probably harmful in others. Furthermore, the annoyance of securing the seat belts and the discomfort of using them has militated against their general adoption.

In its broadest aspect the present invention provides means whereby the passenger seat or seats move automatically to cradle the occupants thereof and thus overcome or nullify the normal tendency of passengers to be thrown forwardly off the seat and against injury inflicting obstructions.

More particularly, the present invention provides hydraulic fluid pressure means operable from an actuating means disposed forwardly of the conventional vehicle bumper upon impact or collision at the front of the vehicle for rocking the vehicle seat rearwardly about a lower transverse pivotal connection and simultaneously moving the seat forwardly to thus automatically cradle the passenger in the seat with a combined rocking and scooping action which nullifies the inertia forces tending to throw the passenger forwardly in the vehicle. A general hydraulic arrangement for this purpose is found in Krous Patent No. 2,789,650, issued April 23, 1957, and the present invention comprises an improvement therein.

The most critical factor in successful operation of a safety seat arrangement is the factor of time. Only a split second of time is available between the first impact of collision and the time when a passenger will have moved too far forwardly to be safely retained in the seat by the rocking and scooping action thereof. The present invention provides a hydraulic arrangement wherein a hydraulic column of constant cross-sectional area exists between the operating piston or pistons associated with the front bumper of the vehicle and the motor piston or pistons at the vehicle seat. What would ordinarily be considered an adequate fluid pressure connection between an actuating piston and a remote motor piston for general purposes has been found to be entirely inadequate under the extreme time limitations imposed by the necessities of the present invention.

A surprising difference in result and operation has been made possible by providing a fluid conduit between the actuating cylinder at the bumper and the motor cylinder at the vehicle seat, which conduit is of the identical inside diameter as the inside diameters of the two cylinders, which are likewise the same.

The following specification and the accompanying drawings set forth a representative practical embodiment of the principles of the present invention by way of example but it is to be understood that the scope of the present invention is not limited thereto or otherwise than as defined in the appended claims.

Figure 2:
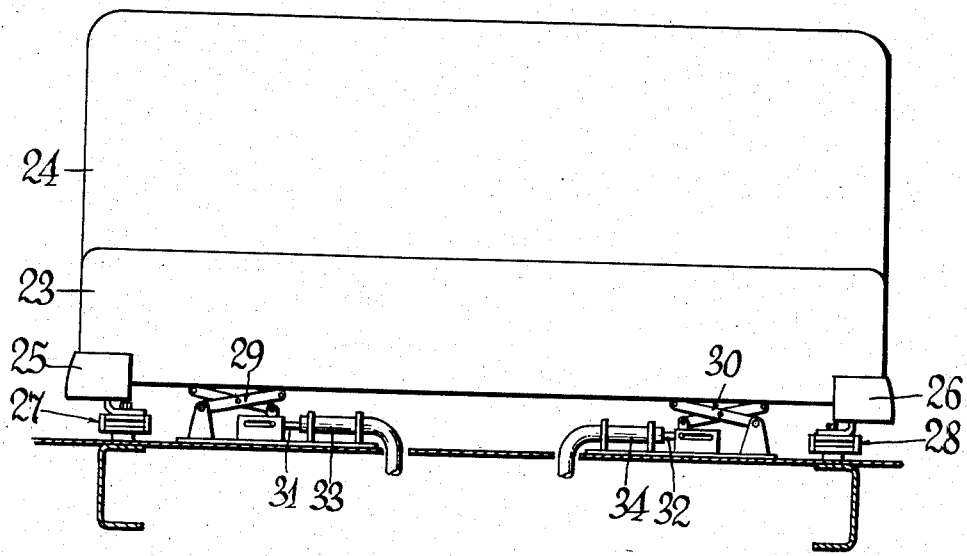

In the drawings:

Fig. 1 is a general top plan view of an automotive vehicle chassis with portions thereof broken away, showing schematically the hydraulic system of one form of the present invention; and Fig. 2 is a front elevational view of a passenger seat with portions thereof broken away for added clearness and showing one form of hydraulic lifting device operable according to the present invention.

In the drawing like characters of reference denote like parts and, referring first to Fig. 1, the numeral 10 designates generally a conventional vehicle chassis frame including front wheels 11 and 12. In Fig. 1 the numeral 15 designates a more or less conventional front bumper and the numeral 16 designates an auxiliary front member which lies forwardly of the conventional bumper 15 so that it meets with an object substantially in advance of the front bumper upon impact or collision. The auxiliary member 16, in the instance shown herein by way of example, wraps around the ends of the conventional bumper 15 and is supported by rods 17 and 18 which are pivoted to the front bumper as at 19 and 20, respectively. The rods 17 and 18 in the present instance telescope within auxiliary member 16 which may be tubular. If desired, the connection between the rods 17 and 18 and the auxiliary member 16 may include spring means normally urging the auxiliary member 16 resiliently forward.

In Fig. 1 a front seat member 23 is shown in dot and dash lines and such seat member is shown in front elevation in Fig. 2 wherein the numeral 24 designates the usual seat back and the numerals 25 and 26 designate conventional seat adjustment means upon which the seat proper is mounted. The seat, through the adjustment means 25 and 26, is mounted on means designated generally by the numerals 27 and 28 which permit the seat to tilt about a transverse axis at the lower rear portion of the seat and such a mounting is shown and described in detail in my companion application, Serial No. 677,856 filed of even date herewith. As shown and described in detail in that application, the devices 27 and 28 not only pivotally support the seat 23 but provide for controlled forward movement of the pivot means upon pivotal raising movement of the front portion of the seat.

Such raising movement of the front portion of the seat is effected by lazy tong or toggle linkages 29 and 30 which are actuated by piston rods 31 and 32, respectively, which extend from pistons contained in hydraulic cylinder members 33 and 34, respectively.

In a preferred form of the present invention and as illustrated in the drawing, the hydraulic cylinders 33 and 34 comprise the terminal portions of a pair of hydraulic conduits designated 35 and 36, respectively, and the conduits 35 and 36 extend forwardly to the conventional front bumper to which they may be attached in any desired manner. At such front bumper mounting the conduits 35 and 36 likewise terminate in hydraulic cylinder portions adapted to receive pistons having forwardly directed piston rods designated 37 and 38, respectively, and in the present instance the piston rods 37 and 38 are provided at their front ends with head members 39 and 40, respectively, which normally abut the rear surfaces of the auxiliary front member 16.

From this it will be seen that impact against the auxiliary front member 16 moves one or both of the associated piston rods rearwardly which moves one or both of the hydraulic columns in the conduits 35 and 36 rearwardly to act upon the pistons in the cylinder portions 33 and 34 and project the piston rods 31 and 32 thereof to raise the seat member 23. It is to be understood that actuation of only one of the head members 38 or 39 is sufficient to produce safety seat movement, as when the impact is at one side or the other of the auxiliary front member 16.

A vital factor in the practical success of the safety seat mechanism contemplated herein is the ability of the seat to move fast enough upon collision or impact to scoop the passengers into a cradled condition before they are thrown forwardly by the sudden deceleration of the vehicle. I have found that sufficiently rapid hydraulic operation can only be achieved when the conduits between the forwardly disposed actuating cylinders and the rearwardly disposed motor cylinders are of substantially identical cross-sectional area with no steps or flanges or changes of diameter, either by way of enlargement or reduction.

I claim:

1. In an automotive vehicle, a passenger seat, means attaching said seat to said vehicle for movement generally about a transverse axis adjacent to the lower rear portion of said seat, hydraulic fluid cylinder means and a piston movable therein to raise the front portion of said seat about said axis, a conventional front bumper, hydraulic fluid cylinder means mounted on said bumper, transversely extending actuating means forwardly of said bumper and movable toward the latter upon impact with an obstruction, a piston movable in said bumper mounted cylinder means and a connection between said piston and said actuating means, said two cylinder means having substantially the same internal cross sectional area, and a conduit between said two cylinder means likewise of substantially the same cross sectional area to provide a continuous hydraulic fluid column of substantially constant cross sectional area extending from the face of the actuating means operated piston to the face of the seat raising piston.

2. In an automotive vehicle, a passenger seat, means attaching said seat to said vehicle for movement generally about a transverse axis adjacent to the lower rear portion of said seat, hydraulic fluid cylinder means and a piston movable therein to raise the front portion of said seat about said axis, hydraulic fluid cylinder means mounted at a forward portion of said vehicle, transversely extending actuating means disposed forwardly of said vehicle and movable rearwardly relative to the vehicle upon impact with an obstruction, a piston movable in said second mentioned cylinder means and a connection between said piston and said actuating means, said two cylinder means having substantially the same internal cross sectional area, and a conduit between said two cylinder means likewise of substantially the same cross sectional area to provide a continuous hydraulic fluid column of substantially constant cross sectional area extending from the face of the second mentioned piston to the face of the seat raising piston.

3. In an automotive vehicle, a passenger seat, means attaching said seat to said vehicle for movement from a normal position to a passenger retaining position, hydraulic fluid cylinder means and a piston movable therein to move said seat to said passenger retaining position, a conventional front bumper, hydraulic fluid cylinder means mounted on said bumper, transversely extending actuating means forwardly of said bumper and movable toward the latter upon impact with an obstruction, a piston movable in said bumper mounted cylinder means and a connection between said piston and said actuating means, said two cylinder means having substantially the same internal cross sectional area, and a conduit between said two cylinder means likewise of substantially the same cross sectional area to provide a continuous hydraulic fluid column of substantially constant cross sectional area extending from the face of the actuating means operated piston to the face of the seat raising piston.

4. In an automotive vehicle, a passenger seat, means attaching said seat to said vehicle for movement from a normal position to a passenger retaining position, hydraulic fluid cylinder means and a piston movable therein to move said seat to said passenger retaining position, hydraulic fluid cylinder means mounted at a forward portion of said vehicle, transversely extending actuating means disposed forwardly of said vehicle and movable rearwardly relative to the vehicle upon impact with an obstruction, a piston movable in said second mentioned cylinder means and a connection between said piston and said actuating means, said two cylinder means having substantially the same internal cross sectional area, and a conduit between said two cylinder means likewise of substantially the same cross sectional area to provide a continuous hydraulic fluid column of substantially constant cross sectional area extending from the face of the second mentioned piston to the face of the seat raising piston.

5. In an automotive vehicle, a passenger seat, means attaching said seat to said vehicle for movement generally about a transverse axis adjacent to the lower rear portion of said seat, hydraulic fluid cylinder means and a piston movable therein to raise the front portion of said seat about said axis, and other hydraulic fluid cylinder means mounted adjacent to the front of said vehicle, a conventional front bumper, transversely extending actuating means forwardly of said bumper and movable toward the latter upon impact with an obstruction, a piston movable in said other cylinder means and a connection between said piston and said actuating means, said two cylinder means having substantially the same internal cross sectional area, and a conduit between said two cylinder means likewise of substantially the same cross sectional area to provide a continuous hydraulic fluid column of substantially constant cross sectional area extending from the face of the piston of said other cylinder means to the face of the seat raising piston.

6. In an automotive vehicle, a passenger seat, means attaching said seat to said vehicle for movement from a normal position to a passenger retaining position, hydraulic fluid cylinder means and a piston movable therein to move said seat to said passenger retaining position, and other hydraulic fluid cylinder means mounted adjacent to the front of said vehicle, a conventional front bumper, transversely extending actuating means forwardly of said bumper and movable toward the latter upon impact with an obstruction, a piston movable in said other cylinder means and a connection between said piston and said actuating means, said two cylinder means having substantially the same internal cross sectional area, and a conduit between said two cylinder means likewise of substantially the same cross sectional area to provide a continuous hydraulic fluid column of substantially constant cross sectional area extending from the face of the piston of said other cylinder means to the face of the seat raising piston.

7. In an automotive vehicle, a passenger seat, means attaching said seat to said vehicle for movement from a normal position to a passenger retaining position, hydraulic fluid cylinder means and a piston movable therein to move said seat to said passenger retaining position, a conventional front bumper, hydraulic fluid cylinder means mounted on said bumper, actuating means projecting forwardly of said bumper and movable toward the latter upon impact with an obstruction, a piston movable in said bumper mounted cylinder means and a connection between said piston and said actuating means, said two cylinder means having substantially the same internal cross sectional area, and a conduit between said two cylinder means likewise of substantially the same cross sectional area to provide a continuous hydraulic fluid column of substantially constant cross sectional area extending from the face of the actuating means operated piston to the face of the seat raising piston.

8. In an automotive vehicle, a passenger seat, means attaching said seat to said vehicle for movement from a normal position to a passenger retaining position, hydraulic fluid cylinder means and a piston movable therein to move said seat to said passenger retaining position, hydraulic fluid cylinder means mounted at a forward portion of said vehicle, actuating means projecting forwardly of said vehicle and movable rearwardly relative to the vehicle upon impact with an obstruction, a piston movable in said second mentioned cylinder means and a connection between said piston and said actuating means, said two cylinder means having substantially the same internal cross sectional area, and a conduit between said two cylinder means likewise of substantially the same cross sectional area to provide a continuous hydraulic fluid column of substantially constant cross sectional area extending from the face of the second mentioned piston to the face of the seat raising piston.

9. In an automotive vehicle, a passenger seat, means attaching said seat to said vehicle for movement generally about a transverse axis adjacent to the lower rear portion of said seat, hydraulic fluid cylinder means and a piston movable therein to raise the front portion of said seat about said axis, and other hydraulic fluid cylinder means mounted adjacent to the front of said vehicle, a conventional front bumper, actuating means projecting forwardly of said bumper and movable toward the latter upon impact with an obstruction, a piston movable in said other cylinder means and a connection between said piston and said actuating means, said two cylinder means having substantially the same internal cross sectional area, and a conduit between said two cylinder means likewise of substantially the same cross sectional area to provide a continuous hydraulic fluid column of substantially constant cross sectional area extending from the face of the piston of said other cylinder means to the face of the seat raising piston.

10. In an automotive vehicle, a passenger seat, means attaching said seat to said vehicle for movement from a normal position to a passenger retaining position, hydraulic fluid cylinder means and a piston movable therein to move said seat to said passenger retaining position, and other hydraulic fluid cylinder means mounted adjacent to the front of said vehicle, a conventional front bumper, actuating means projecting forwardly of said bumper and movable toward the latter upon impact with an obstruction, a piston movable in said other cylinder means and a connection between said piston and said actuating means, said two cylinder means having substantially the same internal cross sectional area, and a conduit between said two cylinder means likewise of substantially the same cross sectional area to provide a continuous hydraulic fluid column of substantially constant cross sectional area extending from the face of the piston of said other cylinder means to the face of the seat raising piston.

References Cited in the file of this patent
UNITED STATES PATENTS

| | | |
|---|---|---|
| 760,978 | Fuller | May 24, 1904 |
| 2,789,650 | Krous | Apr. 23, 1957 |